United States Patent [19]

Darden et al.

[11] Patent Number: 4,647,392
[45] Date of Patent: Mar. 3, 1987

[54] MONOBASIC-DIBASIC ACID/SALT ANTIFREEZE CORROSION INHIBITOR

[75] Inventors: Jerome W. Darden; Carol A. Triebel, both of Austin, Tex.; Walter A. Van Neste, St. Amandsberg; Jean P. Maes, Merelbeke, both of Belgium

[73] Assignees: Texaco Inc., White Plains, N.Y.; S. A. Texaco Belgium N.V.

[21] Appl. No.: 813,902

[22] Filed: Dec. 27, 1985

[51] Int. Cl.[4] ............................................. C09K 5/00
[52] U.S. Cl. ...................................... 252/75; 252/73; 252/76; 252/77; 252/79; 252/389.4; 252/389.62; 252/389.54; 252/390; 252/391; 252/396
[58] Field of Search ................... 252/73, 75, 76, 77, 252/79, 389.4, 389.54, 389.62, 390, 391, 396

[56] References Cited

U.S. PATENT DOCUMENTS

| 3,573,225 | 3/1971 | Kondo et al. ...................... 252/392 |
| 3,931,029 | 1/1976 | Dutton et al. ...................... 252/396 |
| 4,342,596 | 8/1982 | Conner, Sr. ...................... 106/14.27 |
| 4,382,008 | 5/1983 | Boreland et al. ...................... 252/79 |
| 4,390,439 | 6/1983 | Schwartz et al. ...................... 252/79 |
| 4,448,702 | 5/1984 | Kaes ...................... 252/70 |
| 4,584,119 | 4/1986 | Duranleau et al. ...................... 252/75 |
| 4,587,028 | 5/1986 | Darden ...................... 252/75 |
| 4,588,513 | 5/1986 | Triebel et al. ...................... 252/75 |
| 4,592,853 | 6/1986 | Darden et al. ...................... 252/75 |

FOREIGN PATENT DOCUMENTS

| 2489355 | 3/1982 | France . |
| 112756 | 7/1984 | France . |
| 2122598 | 1/1984 | United Kingdom ............... 252/396 |

OTHER PUBLICATIONS

G. Butler et al., "Inhibitor Formulations for Engine Coolants," Brit. Corr. J., vol. 12, No. 3, pp. 171–174, 1977.

Primary Examiner—Robert A. Wax
Attorney, Agent, or Firm—Robert A. Kulason; James J. O'Loughlin

[57] ABSTRACT

A corrosion inhibitor for use in water and liquid alcohol antifreeze/coolant compositions comprising the combination of a $C_5$–$C_{16}$ aliphatic monobasic acid or the alkali metal, ammonium, or amine salt of said acid, a $C_5$–$C_{16}$ hydrocarbyl dibasic acid or the alkali metal, ammonium, or amine salt of said acid, and a hydrocarbyl triazole gives synergistic corrosion protection to metal surfaces as compared with formulations containing either the monoacid or diacid component alone, or formulations containing other conventional corrosion inhibitors.

30 Claims, No Drawings

MONOBASIC-DIBASIC ACID/SALT ANTIFREEZE CORROSION INHIBITOR

BACKGROUND OF THE INVENTION

1. Field of the Invention

This invention relates to a metal corrosion inhibitor for use in aqueous solutions, and to antifreeze/coolant compositions containing such a corrosion inhibitor. More particularly, this invention relates to a corrosion inhibitor comprising a combination of monobasic and dibasic acids or the alkali metal, ammonium, or amine salts of said acids, and a hydrocarbyl triazole, and to antifreeze/coolant compositions containing the same.

Automobile engine cooling systems contain a variety of metals, including copper, solder, brass, steel, cast iron, aluminum, magnesium, and their alloys. The possibility of corrosive attack on such metals is high, due to the presence of various ions as well as the high temperatures, pressures, and flow rates found in such cooling systems. The presence of corrosion products within the cooling system can interfere with heat transfer from the engine combustion chambers, which may subsequently cause engine overheating and engine component failure due to excess metal temperatures. See generally Fay, R. H., "Antifreezes and Deicing Fluids," In: Kirk-Othmer Encyclopedia of Chemical Technology (1978 ed.), vol. 3, pp. 79–95. It would therefore be generally advantageous if the formation of corrosion products within automobile cooling systems could be controlled or eliminated. It is one object of the instant invention to provide a corrosion inhibitor useful in the prevention and control of corrosion in automobile engine cooling systems containing various metals.

The trend towards improved fuel economy for automobiles has led to the increased use of aluminum and in some cases magnesium for engine and cooling system components. However, it has been found that pitting and crevice corrosion are particularly prevalent in aluminum-containing cooling systems. Many conventional corrosion inhibitor additives used in automobile cooling systems do not provide adequate protection against the pitting and crevice corrosion phenomena found with various aluminum and magnesium alloys. It would therefore be particularly advantageous if the pitting and crevice corrosion phenomena found in automobile cooling systems containing aluminum or magnesium alloys could be controlled or eliminated. It is another object of the instant invention to provide a corrosion inhibitor for use in automobile cooling systems which prevents or controls pitting and crevice corrosion of aluminum and magnesium metal surfaces.

All corrosion inhibitors employed in automobile antifreeze/coolant formulations are gradually depleted by use and the build-up of corrosion products in the cooling system. It would thus be advantageous if the build-up or corrosion products within the system and subsequent corrosion inhibitor depletion or degradation could be controlled or eliminated. It is a further object of the instant invention to provide a corrosion inhibitor which is less prone to depletion or degradation than traditional corrosion inhibitors used in antifreeze/coolant formulations.

2. Information Disclosure Statement

It is well known that various monobasic and dibasic acids as well as the salts of such acids are individually effective as corrosion inhibitors when employed in antifreeze/coolant formulations. For example, the use of sodium salts of various monobasic or dibasic acids as mild steel corrosion inhibitors in aqueous solutions is disclosed in Hersch, P., et al., "An Experimental Survey Of Rust Preventives In Water—II. The Screening Of Organic Inhibitors," *Journal of Applied Chemistry*, vol. 11 (July, 1961), pp. 254–55. The use of a mixture of sodium sebacate (the sodium salt of sebacic acid) and benzotriazole as a useful corrosion inhibitor in engine coolants is disclosed in G. Butler and A. D. Mercer, "Inhibitor Formulations for Engine Coolants," *British Corrosion Journal*, vol. 12., no. 3 (1977), pp. 171–74.

Several U.S. and foreign patent references disclose the use of various monobasic or dibasic acids, or the salts of such acids, as corrosion inhibitors for use in antifreeze/coolant compositions:

U.S. Pat. No. 4,448,702 discloses the use of at least one water-soluble salt of a dicarboxylic acid having at least 3 carbon atoms as a corrosion inhibitor in antifreeze formulations;

U.S. Pat. No. 4,382,008 discloses a corrosion inhibitor for use in antifreeze compositions comprising the alkali metal salt of a $C_7$–$C_{13}$ dicarboxylic acid, an alkali metal benzoate or toluate, a triazole, an alkali metal borate, and an alkali metal silicate;

U.S. Pat. No. 4,342,596 discloses a corrosion inhibiting composition for metals comprising 5–20 parts of a $C_8$–$C_{20}$ aliphatic monobasic acid, 0.5–4 parts of a lubricant, 0.5–4.0 parts of an amino alkylalkanolamine, 10–35 parts of an aromatic mono- or polycarboxylic acid, and an amine used to form a water-soluble salt with the aromatic acid;

U.S. Pat. No. 3,931,029 discloses the use of certain unsaturated cycloalkylene dicarboxylic acids as well as the mono- and di-metal salts, mono- and di-ammonium salts, and mono- and di-amides of such acids as antifreeze additives to inhibit corrosion of contacted solder alloys;

U.S. Pat. No. 3,573,225 discloses a corrosion inhibitor containing 50–100 parts of a salt of a $C_6$–$C_{18}$ saturated carboxylic acid, 20–200 parts of an alkali metal benzoate, and 1–50 parts of an alkanolamide selected from the reaction products of ethanolamines and a saturated $C_6$–$C_{18}$ fatty acid;

U.K. Pat. Appl. GB No. 2,122,598 discloses a metal corrosion inhibitor which comprises at least one $C_6$–$C_{10}$ aliphatic carboxylic acid, at least one $C_6$–$C_8$ polyhydroxycarboxylic acid, and at least one aromatic monocarboxylic acid, in which each of the acids is present as a salt;

Chemical Abstracts, vol. 101, paragraph 115489n (1984) describes Eur. Pat. Appl. EP No. 112,756, which discloses the use of the alkali metal or amine salts of $C_4$–$C_{12}$ alkyl dicarboxylic acids in combination with $C_5$–$C_{12}$ polyols as corrosion inhibitors in antifreeze liquids;

Derwent Abstract of Week C51 for Eur. Pat. No. 20,042 discloses an aqueous corrosion inhibitor comprising 5–20 parts of an aliphatic $C_8$–$C_{20}$ monobasic acid, 10–35 parts of an aromatic mono- or poly- carboxylic acid, 0–4 parts of a lubricant, and an amine forming water soluble salts with the acids; and Chemical Abstracts, vol. 97, paragraph 58367u (1982) describes French Demande FR No. 2,489,355, which discloses the use of disodium sebacate as a corrosion inhibitor in antifreeze liquids.

SUMMARY OF THE INVENTION

The instant invention is directed to a novel corrosion inhibitor composition for use in aqueous systems, an antifreeze/coolant concentrate composition containing said novel corrosion inhibitor, and an aqueous antifreeze/coolant composition containing said novel corrosion inhibitor. It has been discovered that the novel corrosion inhibitor of the instant invention has a synergistic corrosion inhibiting effect when employed in antifreeze/coolant compositions. The novel corrosion inhibitor composition comprises the combination of a $C_5$-$C_{16}$, preferably a $C_8$-$C_{12}$ aliphatic monobasic acid or the alkali metal, ammonium, or amine salt of said acid, a $C_5$-$C_{16}$, preferably a $C_8$-$C_{12}$ hydrocarbyl dibasic acid or the alkali metal, ammonium, or amine salt of said acid, and a hydrocarbyl triazole, preferably an aromatic triazole such as benzotriazole or tolyltriazole. The most preferred corrosion inhibitor of the instant invention comprises a $C_8$-$C_{12}$ aliphatic monobasic acid, preferably octanoic acid or the alkali metal, ammonium, or amine salt of said acid, a $C_8$-$C_{12}$ aliphatic dibasic acid, preferably sebacic acid or the alkali metal, ammonium, or amine salt of said acid, and an aromatic triazole, preferably tolyltriazole. This corrosion inhibitor gives synergistic corrosion protection to metal surfaces as compared with corrosion inhibitor compositions containg monobasic or dibasic acid components alone.

The antifreeze/coolant concentrate composition of the instant invention comprises a minor amount of the novel corrosion inhibitor in admixture with a major amount of a water-soluble liquid alcohol freezing point depressant, preferably ethylene glycol, and a sufficient amount of an alkali metal hydroxide to adjust the pH of the composition to a range between 6.5–9.5, preferably 7.0–9.0.

The aqueous antifreeze/coolant composition of the instant invention comprises a minor amount of the novel corrosion inhibitor in admixture with water, a water-soluble liquid alcohol freezing point depressant, preferably ethylene glycol, and a sufficient amount of an alkali metal hydroxide to adjust the pH of the composition to a range between 6.5–9.5, preferably 7.0–9.0.

Conventional corrosion inhibitors such as alkali metal borates, alkali metal silicates, alkali metal benzoates, alkali metal nitrates, alkali metal nitrites, alkali metal molybdates, and hydrocarbyl thiazoles may also be employed in combination with the novel corrosion inhibitor composition of the instant invention.

DETAILED EMBODIMENTS OF THE INVENTION

The novel corrosion inhibitor of the instant invention comprises the combination of an aliphatic monobasic acid or the alkali metal, ammonium, or amine salt of said acid, a hydrocarbyl dibasic acid or the alkali metal, ammonium, or amine salt of said acid, and a hydrocarbyl triazole for use as a corrosion inhibitor in aqueous systems, particularly in automobile antifreeze/coolant compositions.

The aliphatic monobasic acid component of the above-described corrosion inhibitor may be any $C_5$-$C_{16}$ aliphatic monobasic acid or the alkali metal, ammonium, or amine salt of said acid, preferably at least one $C_8$-$C_{12}$ aliphatic monobasic acid or the alkali metal, ammonium, or amine salt of said acid. This would include one or more of the following acids or isomers thereof: octanoic, nonanoic, decanoic, undecanoic and dodecanoic, and mixtures thereof. Octanoic acid is particularly preferred. Any alkali metal, ammonium, or amine can be used to form the monobasic acid salt; however, alkali, metals are preferred. Sodium and potassium are the preferred alkali metals for use in forming the monobasic acid salt.

The dibasic acid component of the above-described corrosion inhibitor may be any hydrocarbyl $C_5$-$C_{16}$ dibasic acid or the alkali metal, ammonium, or amine salt of said acid, preferably at least one $C_8$-$C_{12}$ hydrocarbyl dibasic acid or the alkali metal, ammonium, or amine salt of said acid. Included within this group are both aromatic and aliphatic $C_5$-$C_{16}$ dibasic acids and salts, preferably $C_8$-$C_{12}$ aliphatic dibasic acids and the alkali metal, ammonium, or amine salts of said acids. This would include one or more of the following acids: suberic, azelaic, sebacic, undecanedioic, dodecanedioic, the diacid of dicyclopentadiene (hereinafter referred to as DCPDDA), terephthalic, and mixtures thereof. Sebacic acid is particularly preferred. Any alkali metal, ammonium, or amine can be used to form the dibasic acid salt; however, alkali metals are preferred. Sodium and potassium are the preferred alkali metals for use in forming the dibasic acid salt.

The hydrocarbyl triazole component of the above-described corrosion inhibitor is preferably an aromatic triazole or an alkyl-substituted aromatic triazole; for example, benzotriazole or tolyltriazole. The most preferred triazole for use is tolyltriazole. The hydrocarbyl triazole may be employed at concentrations of about 0.1–0.5 wt.%, preferably about 0.1–0.3 wt.%.

The above-described corrosion inhibitor mixture will most typically be employed in antifreeze formulations as coolants for internal combustion engines. Other applications may include hydraulic fluids, aqueous cutting oils, paints, soluble oils, metal cutting fluids, aircraft deicers, and greases. In these applications, the monobasic and dibasic acid salts may be formed with metal hydroxides including sodium, potassium, lithium, barium, calcium, and magnesium.

The antifreeze formulations most commonly used include mixtures of water and water soluble liquid alcohol freezing point depressants such as glycol and glycol ethers. The glycol ethers which can be employed as major components in the present composition include glycols such as ethylene glycol, diethylene glycol, propylene glycol, and dipropylene glycol, and glycol monoethers such as the methyl, ethyl, propyl and butyl ethers of ethylene glycol, diethylene glycol, propylene glycol, and dipropylene glycol. Ethylene glycol is particularly preferred as the major antifreeze formulation component.

In one preferred embodiment of the instant invention, the above-described corrosion inhibitor is employed in admixture with an aqueous antifreeze/coolant solution comprising 10% to 90% by weight of water, preferably 25% to 50% by weight, a water soluble liquid alcohol freezing point depressant, preferably ethylene glycol, and at least one alkali metal hydroxide which is employed to adjust the pH of the composition to a range from about 6.5 to 9.5, preferably from about 7.0 to 9.0.

The approximate proportions of the basic acid components of the above-described corrosion inhibitor solution (based upon the water soluble liquid alcohol freezing point depressant present) are: about 0.1 to 15.0 wt.%, preferably about 0.1 to 2.5 wt.% aliphatic monobasic acid or salt (calculated as the free acid); and about 0.1 to 15.0 wt.%, preferably about 0.1 to 2.5 wt.% hydrocarbyl dibasic acid (calculated as the free acid).

One or more additional conventional corrosion inhibitors may also be employed in combination with the above-described corrosion inhibitor. Such conventional corrosion inhibitors may be employed at concentrations of 0.01–5.0 wt.%, and may be selected from the group comprising: alkali metal borates, alkali metal silicates, alkali metal benzoates, alkali metal nitrates, alkali metal nitrites, alkali metal molybdates, and hydrocarbyl thiazoles. The most preferred conventional corrosion inhibitors for use in combination with the novel corrosion inhibitor of the instant invention are hydrocarbyl triazoles, hydrocarbyl thiazoles, and sodium metasilicate pentahydrate. Organosilane stabilizers may also be employed in conjunction with the sodium metasilicate pentahydrate.

The method of this invention will be further illustrated by the following examples, which are not intended to limit the invention, but rather to illuminate it. In the following examples, all percents are weight percents unless otherwise specified.

EXAMPLE 1A (Control Example)

An antifreeze formulation was prepared comprising a major amount of ethylene glycol, 0.2% tolyltriazole, 3.9% DCPDDA, and sufficient NaOH to modify the pH of the formulation to between 7.0 and 9.0.

EXAMPLE 1B

To the antifreeze formulation of Example 1A, 0.125% neodecanoic acid was added, together with sufficient NaOH to modify the pH of the formulation to between 7.0 and 9.0.

EXAMPLE 1C

To the antifreeze formulation of Example 1A, 0.3% neodecanoic acid was added, together with sufficient NaOH to modify the pH of the formulation to between 7.0 and 9.0.

EXAMPLE 2A (Control Example)

An antifreeze formulation was prepared comprising a major amount of ethylene glycol, 0.2% tolyltriazole, 1.5% sebacic acid, 1.9% terephthalic acid, and sufficient NaOH to modify the pH of the formulation to between 7.0 and 9.0.

EXAMPLE 2B

To the antifreeze formulation of Example 2A, 0.1% neodecanoic acid was added, together with sufficient NaOH to modify the pH of the formulation to between 7.0 and 9.0.

EXAMPLE 2C

To the antifreeze formulation of Example 2A, 0.3% neodecanoic acid was added, together with sufficient NaOH to modify the pH of the formulation to between 7.0 and 9.0.

EXAMPLE 2D

To the antifreeze formulation of Example 2A, 0.5% neodecanoic acid was added, together with sufficient NaOH to modify the pH of the formulation to between 7.0 and 9.0.

EXAMPLE 3A

An antifreeze formulation was prepared comprising a major amount of ethylene glycol, 0.2% tolyltriazole, 1.5% azelaic acid, 1.9% terephthalic acid, and 0.1% neodecanoic acid, as well as sufficient NaOH to modify the pH of the formulation to between 7.0 and 9.0.

EXAMPLE 3B

An antifreeze formulation was prepared comprising a major amount of ethylene glycol, 0.2% tolyltriazole, 1.5% azelaic acid, 1.9% terephthalic acid, and 0.3% neodecanoic acid, as well as sufficient NaOH to modify the pH of the formulation to between 7.0 and 9.0.

EXAMPLE 4A (Control Example)

An antifreeze formulation was prepared comprising of a major amount of ethylene glycol, 0.2% tolyltriazole, 1.9% terephthalic acid, 1.5% sebacic acid, and sufficient NaOH to modify the pH of the formulation to between 7.0 and 9.0.

EXAMPLE 4B

To the antifreeze formulation of Example 4A, 0.1% 2-ethylhexanoic acid was added, together with sufficient NaOH to modify the pH of the formulation to between 7.0 and 9.0.

EXAMPLE 4C

To the antifreeze formulation of Example 4A, 0.5% 2-ethylhexanoic was added, together with sufficient NaOH to modify the pH of the formulation to between 7.0 and 9.0.

EXAMPLE 5

(Comparative Example)

An antifreeze formulation was prepared comprising a major of ethylene glycol, 0.2% tolyltriazole, 3.9% DCPDDA, 0.3% NaNO$_3$, and sufficient NaOH to modify the pH of the formulation to between 7.0 and 9.0.

EXAMPLE 6

(Comparative Example)

An antifreeze formulation was prepared comprising a major amount of ethylene glycol, 0.2% tolyltriazole, 1.9% terephthalic acid, 1.5% sebacic acid, 0.2% NaNO$_3$ and sufficient NaOH to modify the pH of the formulation to between 7.0 and 9.0.

EXAMPLE 7

An antifreeze formulation was prepared comprising a major amount of ethylene glycol, 0.1% tolyltriazole, 2.6% neodecanoic acid, 1.5% sebacic acid, and sufficient NaOH to modify the pH of the formulation to between 7.0 and 9.0.

EXAMPLE 8

An antifreeze formulation was prepared comprising a major amount of ethylene glycol, 0.1% tolyltriazole, 2.5% 2-ethylhexanoic acid, 1.5% sebacic acid, and sufficient NaOH to modify the pH of the formulation to between 7.0 and 9.0.

EXAMPLE 9

(Control Example)

An antifreeze formulation was prepared comprising a major amount of ethylene glycol, 0.2% tolyltriazole, 5.0% neodecanoic acid, and sufficient NaOH to modify the pH of the formulation to between 7.0 and 9.0.

EXAMPLE 10

An antifreeze formulation was prepared comprising a major amount of ethylene glycol, 0.2% tolyltriazole, 0.9% sebacic acid, 1.15% octanoic acid, 0.6% nonanoic acid, and sufficient NaOH to modify the pH of the formulation to between 7.0 and 9.0.

EXAMPLE 11A (Control Example)

An antifreeze formulation was prepared comprising a major amount of ethylene glycol, 0.2% tolyltriazole, 2.2% sebacic acid, and sufficient NaOH to modify the pH of the formulation to between 7.0 and 9.0.

EXAMPLE 11B (Control Example)

An antifreeze formulation was prepared comprising a major amount of ethylene glycol, 0.2% tolyltriazole, 3.3% sebacic acid, and sufficient NaOH to modify the pH of the formulation to between 7.0 and 9.0.

EXAMPLE 12

An antifreeze formulation was prepared comprising a major amount of ethylene glycol, 0.2% tolyltriazole, 0.5% 2-ethylhexanoic acid, 3.9% DCPDDA, and sufficient NaOH to modify the pH of the formulation to between 7.0 and 9.0.

EXAMPLE 13A

An antifreeze formulation was prepared comprising a major amount of ethylene glycol, 0.2% tolyltriazole, 0.3% octanoic acid, 3.9% DCPDDA, and sufficient NaOH to modify the pH of the formulation to between 7.0 and 9.0.

EXAMPLE 13B

An antifreeze formulation was prepared comprising a major amount of ethylene glycol, 0.2% tolyltriazole, 0.5% octanoic acid, 3.9% DCPDDA, and sufficient NaOH to modify the pH of the formulation to between 7.0 and 9.0.

EXAMPLE 14

An antifreeze formulation was prepared comprising a major amount of ethylene glycol, 0.2% tolyltriazole, 3.9% DCPDDA, and 0.3% of a blend of octanoic and decanoic acids, and sufficient NaOH to modify the pH of the formulation to between 7.0 and 9.0.

EXAMPLE 15

An antifreeze formulation was prepared comprising a major amount of ethylene glycol, 0.2% tolyltriazole, 2.14% octanoic acid, 0.86% sebacic acid, and sufficient NaOH to modify the pH of the formulation to between 7.0 and 9.0.

EXAMPLE 16

An antifreeze formulation was prepared comprising a major amount of ethylene glycol, 0.2% tolyltriazole, 2.14% 2-ethylhexanoic acid, 0.86% sebacic acid, and sufficient NaOH to modify the pH of the formulation to between 7.0 and 9.0.

EXAMPLE 17

An antifreeze formulation was prepared comprising a major amount of ethylene glycol, 0.2% tolyltriazole, 1.75% octanoic acid, 1.2% sebacic acid, and sufficient NaOH to modify the pH of the formulation to between 7.0 and 9.0.

EXAMPLE 18A (Control Example)

An antifreeze formulation was prepared comprising a major amount of ethylene glycol, 0.2% tolyltriazole, 1.0% sebacic acid, and sufficient NaOH to modify the pH of the formulation of between 7.0 and 9.0.

EXAMPLE 18B

To the antifreeze formulation of Example 18A, 0.75% octanoic acid was added together with sufficient NaOH to modify the pH of the formulation to between 7.0 and 9.0.

EXAMPLE 18C

To the antifreeze formulation of Example 18A, 1.0% octanoic acid was added together with sufficient NaOH to modify the pH of the formulation to between 7.0 and 9.0.

EXAMPLE 18D

To the antifreeze formulation of Example 18A, 1.15% octanoic acid was added together with sufficient NaOH to modify the pH of the formulation to between 7.0 and 9.0.

EXAMPLE 18E

To the antifreeze formulation of Example 18A, 1.25% octanoic acid was added together with sufficient NaOH to modify the pH of the formulation to between 7.0 and 9.0.

EXAMPLE 18F

To the antifreeze formulation of Example 18A, 1.35% octanoic acid was added together with sufficient NaOH to modify the pH of the formulation to between 7.0 and 9.0.

EXAMPLE 18G

To the antifreeze formulation of Example 18A, 1.50% octanoic acid was added together with sufficient NaOH to modify the pH of the formulation to between 7.0 and 9.0.

EXAMPLE 18H

To the antifreeze formulation of Example 18A, 1.65% octanoic acid was added together with sufficient NaOH to modify the pH of the formulation to between 7.0 and 9.0.

EXAMPLE 18I

To the antifreeze formulation of Example 18A, 1.75% octanoic acid was added together with sufficient NaOH to modify the pH of the formulation to between 7.0 and 9.0.

EXAMPLE 18J

To the antifreeze formulation of Example 18A, 1.85% octanoic acid was added together with sufficient NaOH to modify the pH of the formulation to between 7.0 and 9.0.

EXAMPLE 18K

To the antifreeze formulation of Example 18A, 2.0% octanoic acid was added together with sufficient NaOH to modify the pH of the formulation to between 7.0 and 9.0.

EXAMPLE 19A (Comparative Example)

An antifreeze formulation was prepared comprising a major amount of ethylene glycol, and minor amounts of sodium tetraborate, sodium benzoate, sodium nitrite, sodium molybdate, sodium metasilicate, organosilane silicate stabilizer, tolyltriazole, and sufficient NaOH to modify the pH of the formulation to between 7.0 and 9.0.

EXAMPLE 19B (Comparative Example)

To the antifreeze formulation of Example 19A, 0.2% sodium nitrate was added together with sufficient NaOH to modify the pH of the formulation to between 7.0 and 9.0.

EXAMPLE 19C (Comparative Example)

To the antifreeze formulation of Example 19A, 0.3% octanoic acid was added.

EXAMPLE 19D (Comparative Example)

To the antifreeze formulation of Example 19A, 0.3% of a mixture of octanoic and decanoic acid was added.

EXAMPLE 20A

An antifreeze formulation was prepared comprising a major amount of ethylene glycol, 0.2% tolyltriazole, 1.0% sebacic acid, 2.0% octanoic acid, and sufficient NaOH to modify the pH of the formulation to between 7.0 and 9.0.

EXAMPLE 20B

To the antifreeze formulation of Example 20A, 0.2% sodium metasilicate pentahydrate and 0.02% organosilane silicate stabilizer was added together with sufficient NaOH to modify the pH of the formulation to between 7.0 and 9.0.

EXAMPLE 21A

An antifreeze formulation was prepared comprising a major amount of ethylene glycol, 0.2% tolyltriazole, 0.83% sebacic acid, 1.65% octanoic acid, and sufficient NaOH to modify the pH of the formulation to between 7.0 and 9.0.

EXAMPLE 21B

To the antifreeze formulation of Example 21A, 0.2% sodium metasilicate pentahydrate and 0.02% organosilane silicate stabilizer was added together with sufficient NaOH to modify the pH of the formulation to between 7.0 and 9.0.

EXAMPLE 22

(Control Example)

An antifreeze formulation was prepared comprising a major amount of ethylene glycol, 0.2% tolyltriazole, 3.5% sebacic acid, and sufficient NaOH to modify the pH of the formulation to between 7.0 and 9.0.

EXAMPLE 23A (Control Example)

An antifreeze formulation was prepared comprising a major amount of ethylene glycol, 0.2% tolyltriazole, 1.75% octanoic acid, and sufficient NaOH to modify the pH of the formulation to between 7.0 and 9.0.

EXAMPLE 23B

To the antifreeze formulation of Example 23A, 0.35% sebacic acid was added together with sufficient NaOH to modify the pH of the formulation to between 7.0 and 9.0.

EXAMPLE 23C

To the antifreeze formulation of Example 23A, 0.70% sebacic acid was added together with sufficient NaOH to modify the pH of the formulation to between 7.0 and 9.0.

EXAMPLE 23D

To the antifreeze formulation of Example 23A, 1.25% sebacic acid was added together with sufficient NaOH to modify the pH of the formulation to between 7.0 and 9.0.

EXAMPLE 23E

To the antifreeze formulation of Example 23A, 1.75% sebacic acid was added together with sufficient NaOH to modify the pH of the formulation to between 7.0 and 9.0.

EXAMPLE 24

An antifreeze formulation was prepared comprising a major amount of ethylene glycol, 0.2% tolyltriazole, 1.17% octanoic acid, 1.17% sebacic acid, and sufficient NaOH to modify the pH of the formulation to between 7.0 and 9.0.

EXAMPLE 25

An antifreeze formulation was prepared comprising a major amount of ethylene glycol, 0.2% tolyltriazole, 2.0% octanoic acid, 1.25% sebacic acid, and sufficient NaOH to modify the pH of the formulation to between 7.0 and 9.0.

EXAMPLE 26

An antifreeze formulation was prepared comprising a major amount of ethylene glycol, 0.2% tolyltriazole, 1.75% nonanoic acid, 1.20% sebacic acid, and sufficient NaOH to modify the pH of the formulation to between 7.0 and 9.0.

Table I sets forth results obtained via the Galvanostatic Pitting Potential Test (Galvanostatic Test) for various examples of the instant invention as well as comparative examples. The Galvanostatic Test gives a measure of the long-term effectiveness of coolants in preventing pitting corrosion attack in aluminum heat exchangers. By applying a current to an aluminium coupon, an accelerated test was developed. In this test, 50 ml of an antifreeze solution (25% solution of the antifreeze formulation in water which contains chloride ions) are added to the test system. A graphite rod is used as the counterelectrode and a standard calomel electrode (SCE) is used for all potential measurements. A current is applied and the most active (most negative) potential ($E_G$) value observed is taken as the most conservative estimate of pitting potential. The higher (more positive) the $E_G$ value is at a fixed current density, the more effective the antifreeze formulation is in preventing pitting corrosion.

As illustrated by Table I, the combination of monobasic and dibasic acids or the salts of said acids dramatically improves corrosion inhibiting effectiveness as compared with antifreeze/coolant formulations employing only dibasic acids or salts. The addition of as little as 0.1–0.5 wt.% of the monobasic acids neodecanoic, 2-ethylhexanoic, or octanoic acid to an antifreeze/coolant formulation containing one or more dibasic acids results in great improvement in the pitting protection imparted by the formulation.

Furthermore, the instant invention gives pitting protection superior to that given by the commercially employed corrosion inhibitor $NaNO_3$. As illustrated by a comparison of Examples 5 and 13A, 0.3 wt. % octanoic acid provides slightly superior protection from pitting corrosion as compared to 0.3 wt. % $NaNO_3$. However, a comparison of Examples 5A and 13 on a molar basis indicates that octanoic acid is more than 1.5 times as effective as $NaNO_3$ in preventing pitting corrosion.

TABLE I

GALVANOSTATIC PITTING POTENTIAL CORROSION TEST

| Example | Monoacid (wt. %) | Diacid (wt. %) | Other Additives (wt. %) | $E_G$ (mv vs. SCE) |
|---|---|---|---|---|
| 1A | — | DCPDDA (3.9%) | Tolyltriazole (0.2%); NaOH | −595 |
| 1B | Neodecanoic (0.125%) | DCPDDA (3.9%) | Tolyltriazole (0.2%); NaOH | −220 |
| 1C | Neodecanoic (0.3%) | DCPDDA (3.9%) | Tolyltriazole (0.2%); NaOH | −15 |
| 2A | — | Terephthalic (1.9%) & Sebacic (1.5%) | Tolyltriazole (0.2%); NaOH | −361, −250 |
| 2B | Neodecanoic (0.1%) | Terephthalic (1.9%) & Sebacic (1.5%) | Tolyltriazole (0.2%); NaOH | −58, +15 |
| 2C | Neodecanoic (0.3%) | Terephthalic (1.9%) & Sebacic (1.5%) | Tolyltriazole (0.2%); NaOH | +87, +125 |
| 2D | Neodecanoic (0.5%) | Terephthalic (1.9%) & Sebacic (1.5%) | Tolyltriazole (0.2%); NaOH | +225 |
| 3A | Neodecanoic (0.3%) | Terephthalic (1.9%) & Azelaic (1.5%) | Tolyltriazole (0.2%); NaOH | −26 |
| 3B | Neodecanoic (0.3%) | Terephthalic (1.9%) & Azelaic (1.5%) | Tolyltriazole (0.2%); NaOH | +156 |
| 4A | — | Terephthalic (1.9%) & Sebacic (1.5%) | Tolyltriazole (0.2%); NaOH | −330 |
| 4B | 2-Ethylhexanoic (0.1%) | Terephthalic (1.9%) & Sebacic (1.5%) | Tolyltriazole (0.2%); NaOH | −215 |
| 4C | 2-Ethylhexanoic (0.5%) | Terephthalic (1.9%) & Sebacic (1.5%) | Tolyltriazole (0.2%); NaOH | −5 |
| 5 | — | DCPDDA (3.9%) | NaNO$_3$ (0.3%); Tolyltriazole (0.2%); NaOH | −189 |
| 6 | — | Terephthalic (1.9%) & Sebacic (1.5%) | NaNO$_3$ (0.2%); Tolyltriazole (0.2%); NaOH | −61 |
| 7 | Neodecanoic (2.6%) | Sebacic (1.5%) | Tolyltriazole (0.1%); NaOH | +8000 |
| 8 | 2-Ethylhexanoic (2.5%) | Sebacic (1.5%) | Tolyltriazole (0.1%); NaOH | +1220 |
| 9 | Neodecanoic (5.0%) | — | Tolyltriazole (0.2%); NaOH | +900 |
| 10 | Nonanoic (0.6%); Octanoic (1.15%) | Sebacic (0.9%) | Tolyltriazole (0.2%); NaOH | +2200 |
| 11A | — | Sebacic (2.2%) | Tolyltriazole (0.2%); NaOH | −160 |
| 11B | — | Sebacic (3.3%) | Tolyltriazole (0.2%); NaOH | +260 |
| 12 | 2-Ethylhexanoic (0.5%) | DCPDDA (3.9%) | Tolyltriazole (0.2%); NaOH | −143 |
| 13A | Octanoic (0.3%) | DCPDDA (3.9%) | Tolyltriazole (0.2%); NaOH | −115 |
| 13B | Octanoic (0.5%) | DCPDDA (3.9%) | Tolyltriazole (0.2%); NaOH | +182 |
| 14 | Octanoic/Decanoic (0.3%) | DCPDDA (3.9%) | Tolyltriazole (0.2%); NaOH | +100 |
| 15 | Octanoic (2.14%) | Sebacic (0.86%) | Tolyltriazole (0.2%); NaOH | +2242 |
| 16 | 2-Ethylhexanoic (2.14%) | Sebacic (0.86%) | Tolyltriazole (0.2%); NaOH | +875 |

TABLE I-continued
GALVANOSTATIC PITTING POTENTIAL CORROSION TEST

| Example | Monoacid (wt. %) | Diacid (wt. %) | Other Additives (wt. %) | $E_G$ (mv vs. SCE) |
|---|---|---|---|---|
| 17 | Octanoic (1.75%) | Sebacic (1.2%) | Tolyltriazole (0.2%); NaOH | +2550 |
| 18A | — | Sebacic (1.0%) | Tolyltriazole (0.2%); NaOH | −101 |
| 18B | Octanoic (0.75%) | Sebacic (1.0%) | Tolyltriazole (0.2%); NaOH | −375 |
| 18C | Octanoic (1.0%) | Sebacic (1.0%) | Tolyltriazole (0.2%); NaOH | −632 |
| 18D | Octanoic (1.15%) | Sebacic (1.0%) | Tolyltriazole (0.2%); NaOH | −105 |
| 18E | Octanoic (1.25%) | Sebacic (1.0%) | Tolyltriazole (0.2%); NaOH | +595 |
| 18F | Octanoic (1.35%) | Sebacic (1.0%) | Tolyltriazole (0.2%); NaOH | +150 |
| 18G | Octanoic (1.5%) | Sebacic (1.0%) | Tolyltriazole (0.2%); NaOH | +1145 |
| 18H | Octanoic (1.65%) | Sebacic (1.0%) | Tolyltriazole (0.2%); NaOH | +1720 |
| 18I | Octanoic (1.75%) | Sebacic (1.0%) | Tolyltriazole (0.2%); NaOH | +1337 |
| 18J | Octanoic (1.85%) | Sebacic (1.0%) | Tolyltriazole (0.2%); NaOH | +1037 |
| 18K | Octanoic (2.0%) | Sebacic (1.0%) | Tolyltriazole (0.2%); NaOH | +1830 |
| 19A | — | — | Sodium tetraborate; Sodium benzoate; Sodium nitrite; Sodium molybdate; Sodium silicate; Silicate stabilizer; Tolyltriazole; NaOH | −196 |
| 19B | — | — | 0.2% NaNO$_3$ + additives of Example 19A | −182 |
| 19C | Octanoic (0.3%) | — | Same as Example 19A | +19 |
| 19D | Octanoic/Decanoic (0.3%) | — | Same as Example 19A | +116 |
| 20A | Octanoic (2.0%) | Sebacic (1.0%) | Tolyltriazole (0.2%); NaOH | +1775 |
| 20B | Octanoic (2.0%) | Sebacic (1.0%) | Tolyltriazole (0.2%); Na metasilicate pentahydrate (0.2%); Organosilane silicate stabilizer (0.02%); NaOH | +1502 |
| 21A | Octanoic (1.65%) | Sebacic (0.83%) | Tolyltriazole (0.2%); NaOH | +1342 |
| 21B | Octanoic (1.65%) | Sebacic (0.83%) | Tolyltriazole (0.2%); Na metasilicate pentahydrate (0.2%); Organosilane silicate stabilizer (0.02%); NaOH | +1779 |

The corrosion inhibiting properties of various examples of the instant invention were also tested via Rapid Cyclic Potentiokinetic Polarization Scanning (RCP). This technique is described in the CEBELCOR (Centre Belge d'Etude de la Corrosion) publication *Rapports Techniques,* vol. 147, R.T. 272 (August 1984). The technique measures rupture or pitting potential ($E_R$) as well as repassivation potential ($E_P$). The potentials are measured with a silver reference electrode and a working electrode constructed from the material subject to corrosive attack. The higher (more positive) the $E_R$ value, the more effective a given antifreeze formulation is in preventing pitting corrosion initiation and progress. Similarly, a higher (more positive) $E_p$ value indicates that the particular corrosion inhibitor formulation has a greater ability to repassivate existing pits and crevices. Table II sets forth data obtained from RCP scans with an aluminum working electrode for various examples. As illustrated by the $E_R$ and $E_P$ data obtained, the instant invention encourages a synergistic resistance to pitting and crevice corrosion attack.

Table III compares RCP data obtained for several commercially available antifreeze formulations as well as several examples of the instant invention. Aluminum, copper, solder, steel, and magnesium working electrodes were used to test the corrosion inhibiting properties of the formulations with respect to each of the five metals. Note that $E_P$ and $E_R$ values for the commercial antifreeze formulations are generally much more modest than those obtained for the examples of the instant invention. Note also that Example 22, which is a dibasic (sebacic) acid formulation alone, is not as effective in protecting aluminum and magnesium as the monobasic-dibasic acid/salt combination formulations of Examples 18K, 20B, 23D, 23E, and 24.

The corrosion behavior of several of the formulations of the instant invention as well as comparative examples were tested according to the ASTM D-1384 Glassware Corrosion Test, incorporated herein by reference. Table IV sets forth the results obtained. The smaller the weight loss of the metal coupon, the greater the corrosion inhibiting properties of a particular formulation. A negative weight loss signifies a weight increase due to the formation of a protective coating on the coupon. As illustrated by Table IV, the antifreeze formulations of the instant invention provide good corrosion protection for all of the metals tested. In addition, Tables I–III illustrate that the instant invention provides pitting corrosion protection superior to either monobasic or dibasic acid/salt corrosion inhibitors acting alone, or commercial antifreeze/coolant formulations.

TABLE II

RAPID CYCLIC POTENTIOKINETIC POLARIZATION (RCP) SCANS TO DETERMINE CORROSION INHIBITOR EFFECTIVENESS ON ALUMINUM
(33% w/w antifreeze in hard corrosive water)

| Example | Octanoic Acid Concentration (wt. %) | Sebacic Acid Concentration (wt. %) | Rupture Pitting Potential $E_R$ (mv) | Repassivation Potential $E_P$ (mv) |
|---|---|---|---|---|
| 15 | 2.14% | 0.86% | +2150 | +550 |
| 18K | 2.0% | 1.0% | +2500 | +1500 |
| 20B | 2.0% | 1.0% | +1650 | +250 |
| 22 | — | 3.5% | +500 | −500 |
| 23A | 1.75% | — | +900 | −750 |
| 23B | 1.75% | 0.35% | +750 | +250 |
| 23C | 1.75% | 0.70% | +1750 | +550 |
| 23D | 1.75% | 1.25% | +2200 | +1500 |
| 23E | 1.75% | 1.75% | >+2500 | * |
| 24 | 1.17% | 1.17% | +1250 | +500 |
| 25 | 2.0% | 1.25% | >+2500 | * |
| 26 | 1.75% (nonanoic acid) | 1.20% | >+2500 | * |

*No repassivation or rupture potential data taken.

TABLE III

RCP SCANS TO DETERMINE CORROSION INHIBITOR EFFECTIVENESS WITH VARIOUS WORKING ELECTRODES
33% w/w/ antifreeze in hard corrosive water

| Antifreeze Formulation | Al | | Cu | | Solder | | Steel | | Mg | |
|---|---|---|---|---|---|---|---|---|---|---|
| | $E_R$ (mv) | $E_P$ (mv) | $E_R$ (mv) | $E_P$ (mv) | $E_R$ (mv) | $E_P$ (mv) | $E_R$ (mv) | $E_P$ (mv) | $E_R$ (mv) | $E_P$ (mv) |
| Commercial A | +450 | −450 | +850 | +100 | +1100 | +1100 | +500 | +350 | −1750 | −1800 |
| Commercial B | +350 | −350 | +600 | 0 | +150 | −350 | +500 | +500 | * | * |
| Commercial C | +800 | −250 | +600 | +80 | +150 | −300 | +600 | +600 | * | * |
| Example 18K | >+2500 | +1500 | +2500 | +2300 | +1050 | +920 | +600 | +550 | +2000 | −1500 |
| Example 20B | +1650 | +250 | +2500 | +2300 | +1100 | +950 | +600 | +500 | +2000 | −1500 |
| Example 22 | +500 | −500 | +2000 | +2000 | +1300 | +1300 | +600 | +600 | −1000 | −1650 |
| Example 23D | +2000 | +1500 | >+2500 | >+2500 | +1100 | +950 | +600 | +550 | * | * |
| Example 23E | >+2500 | * | >+2500 | >+2500 | +1050 | +1000 | +600 | +600 | * | * |
| Example 24 | +1250 | +500 | >+2500 | >+2500 | +1100 | +900 | +600 | +550 | * | * |

*No data taken.

TABLE IV

ASTM D-1384 GLASSWARE CORROSION TEST
wt. loss (mg/coupon)

| EXAMPLE | Cu | Solder | Brass | Steel | Fe | Al |
|---|---|---|---|---|---|---|
| 7 | 2 | 5 | 3 | 0 | −1 | 5 |
| 8 | 2 | −3 | 2 | 0 | −1 | 4 |
| 9 | 4 | 10 | 5 | 0 | −1 | 20 |
| 10 | 1 | 0 | 0 | 0 | −1 | −2 |
| 11A | 3 | 2 | 1 | −1 | −2 | 5 |
| 11B | 4 | 1 | 2 | 0 | −1 | 8 |
| 15 | −1 | 5 | −1 | −3 | −3 | 0 |
| 16 | 1 | 0 | 1 | −1 | −3 | 0 |
| 17 | 1 | 9 | 0 | 0 | −1 | 3 |
| 18K | −1 | 5 | −1 | −3 | −3 | 0 |
| 20B | 2 | 0 | 2 | −1 | −1 | −2 |
| 22 | 3 | 2 | 1 | −1 | −2 | 5 |
| 25 | 0.3 | 2 | 1 | −1.5 | −2 | −0.2 |
| ASTM spec. Max. | 10 | 30 | 10 | 10 | 10 | 30 |

It will be evident that the terms and expressions employed herein are used as terms of description and not of limitation. There is no intention, in the use of these descriptive terms and expressions, of excluding equivalents of the features described and it is recognized that various modifications are possible within the scope of the invention claimed.

The invention claimed is:

1. A corrosion inhibitor for use in aqueous systems comprising:

(a) from 0.1–15.0 weight percent of a $C_5$–$C_{16}$ aliphatic monobasic acid or the alkali metal, ammonium, or amine salt of said acid;

(b) from 0.1–15.0 weight percent of a $C_5$–$C_{16}$ hydrocarbyl dibasic acid or the alkali metal, ammonium, or amine salt of said acid; and (c) from 0.1–0.5 weight percent of a hydrocarbonyl triazole.

2. The corrosion inhibitor of claim 1, where said $C_5$–$C_{16}$ aliphatic monobasic acid or salt is a $C_8$–$C_{12}$ aliphatic monobasic acid or the alkali metal, ammmonium, or amine salt of said acid, present in a concentration range of 0.1–2.5 weight percent.

3. The corrosion inhibitor of claim 2, wherein said $C_8$–$C_{12}$ aliphatic monobasic acid is selected from the group consisting of octanoic acid, nonanoic acid, decanoic acid, undecanoic acid, dodecanoic acid, 2-ethylhexanoic acid, and neodecanoic acid.

4. The corrosion inhibitor of claim 1, where said $C_5$–$C_{16}$ hydrocarbyl dibasic acid or salt is a $C_8$–$C_{12}$ aliphatic dibasic acid or the alkali metal, ammonium, or amine salt of said acid, present in the concentration range of 0.01–2.5 weight percent.

5. The corrosion inhibitor of claim 4, where said $C_8$–$C_{12}$ aliphatic dibasic acid is selected from the group consisting of: suberic acid, azelaic acid, sebacic acid, undecanedioic acid, dodecanedioic acid, and the diacid of dicyclopentadiene.

6. The corrosion inhibitor of claim 1, where said $C_5$–$C_{16}$ hydrocarbyl dibasic acid or salt is a $C_8$–$C_{12}$ aromatic dibasic acid or the alkali metal, ammonium, or amine salt of said acid, present in a concentration range of 0.1–2.5 weight percent.

7. The corrosion inhibitor of claim 6, where said $C_8$–$C_{12}$ aromatic dibasic acid is terephthalic acid.

8. The corrosion inhibitor of claim 1, where said hydrocarbyl triazole is tolyltriazole or benzotriazole, present in a concentration range of 0.1–0.3 weight percent.

9. The corrosion inhibitor of claim 1, in which an additional corrosion inhibitor is also employed at concentrations of 0.01 to 5.0 weight percent, and is selected from the group consisting of alkali metal borates, alkali metal silicates alkali metal benzoates, alkali metal nitrates, alkali metal nitrites, alkali metal molybdates, and hydrocarbyl thiazoles.

10. The corrosion inhibitor of claim 9, where said additional corrosion inhibitor employed is sodium metasilicate pentahydrate.

11. A corrosion-inhibited aqueous composition comprising a major amount of water and a minor amount of the corrosion inhibitor of claim 1.

12. The corrosion inhibited aqueous composition of claim 11, where an alkali metal hydroxide is added to adjust the pH of said corrosion inhibited aqueous composition to a range of about 6.5–9.5.

13. The corrosion inhibited aqueous composition of claim 12, where said alkali metal hydroxide is sodium hydroxide.

14. A corrosion-inhibited antifreeze composition for use in the cooling system of a water-cooled internal combustion engine comprising a water-soluble liquid alcohol freezing point depressant and an effective amount of a corrosion inhibitor comprising:
(a) from 0.1–15.0 weight percent of a $C_5$–$C_{16}$ aliphatic monobasic acid or the alkali metal, ammonium, or amine salt of said acid;
(b) from 0.1–15.0 weight percent of a $C_5$–$C_{16}$ hydrocarbyl dibasic acid or the alkali metal, ammonium, or amine salt of said acid; and
(c) from 0.1–0.5 weight percent of a hydrocarbyl triazole.

15. The corrosion inhibited antifreeze composition of claim 14, where said $C_5$–$C_{16}$ aliphatic monobasic acid or salt is a $C_8$–$C_{12}$ aliphatic monobasic acid or the alkali metal, ammonium, or amine salt of said acid, present in a concentration range of 0.1–2.5 weight percent.

16. The corrosion inhibited antifreeze composition of claim 15, where said $C_8$–$C_{12}$ aliphatic monobasic acid is selected from the group consisting of octanoic acid, nonanoic acid, decanoic acid, undecanoic acid, dodecanoic acid, 2-ethylhexanoic acid, and neodecanoic acid.

17. The corrosion inhibited antifreeze composition of claim 14 where said $C_5$–$C_{16}$ hydrocarbyl dibasic acid or salt is a $C_8$–$C_{12}$ aliphatic dibasic acid or the alkali metal, ammonium, or amine salt of said acid, present in a concentration range of 0.1–2.5 weight percent.

18. The corrosion inhibited antifreeze composition of claim 17, where said $C_8$–$C_{12}$ aliphatic dibasic acid is selected from the group consisting of: suberic acid, azelaic acid, sebacic acid, undecanedioic acid, dodecanedioic acid, and the diacid of dicyclopentadiene.

19. The corrosion inhibited antifreeze composition of claim 14, where said $C_5$–$C_{16}$ hydrocarbyl dibasic acid or salt is a $C_8$–$C_{12}$ aromatic dibasic acid or the alkali metal, ammonium, or amine salt of said acid, present in a concentration range of 0.1–2.5 weight percent.

20. The corrosion inhibited antifreeze composition of claim 19, where said $C_8$–$C_{12}$ aromatic dibasic acid is terephthalic acid.

21. The corrosion inhibited antifreeze composition of claim 14, where said hydrocarbyl triazole is tolyltriazole or benzotriazole, present in a concentration range of 0.1–0.3 weight percent.

22. The corrosion inhibited composition of claim 14, where an alkali metal hydroxide is added to adjust the pH of said composition to a range of about 6.5–9.5.

23. The corrosion inhibited antifreeze composition of claim 22, where said alkali metal hydroxide is sodium hydroxide.

24. The corrosion inhibited antifreeze composition of claim 14, in which an additional corrosion inhibitor is employed at concentrations of 0.01 to 5.0 weight percent, and is selected from the group consisting of: alkali metal silicates, alkali metal benzoates, alkali metal nitrates, alkali metal nitrites, alkali metal molybdates, and hydrocarbyl thiazoles.

25. The corrosion inhibited antifreeze composition of claim 24, where said additional corrosion inhibitor employed is sodium metasilicate pentahydrate.

26. The corrosion inhibited antifreeze composition of claim 14, in which said liquid alcohol freezing point depressant is ethylene glycol.

27. The corrosion inhibited antifreeze composition of claim 14, in which said antifreeze composition is diluted with water in concentrations of 10–90 weight percent.

28. A process for inhibiting the corrosion of metals present in the cooling system of an internal combustion engine which comprises intimately contacting the metal surface to be inhibited against corrosion with an aqueous composition containing a minor amount of the corrosion inhibitor of claim 1.

29. A process for inhibiting the corrosion of metals present in the cooling system of an internal combustion engine which comprises intimately contacting the metal surface to be inhibited against corrosion with the corrosion inhibited antifreeze composition of claim 14.

30. A process for inhibiting the corrosion of metals present in the cooling system of an internal combustion engine which comprises intimately contacting the metal surface to be inhibited against corrosion with the corrosion inhibited aqueous antifreeze composition of claim 27.

* * * * *